April 22, 1958     D. L. HENSLEY     2,831,565
FLEXIBLE SCREEN BOTTOM FOR COTTON STRIPPERS
Filed April 27, 1955     2 Sheets-Sheet 1
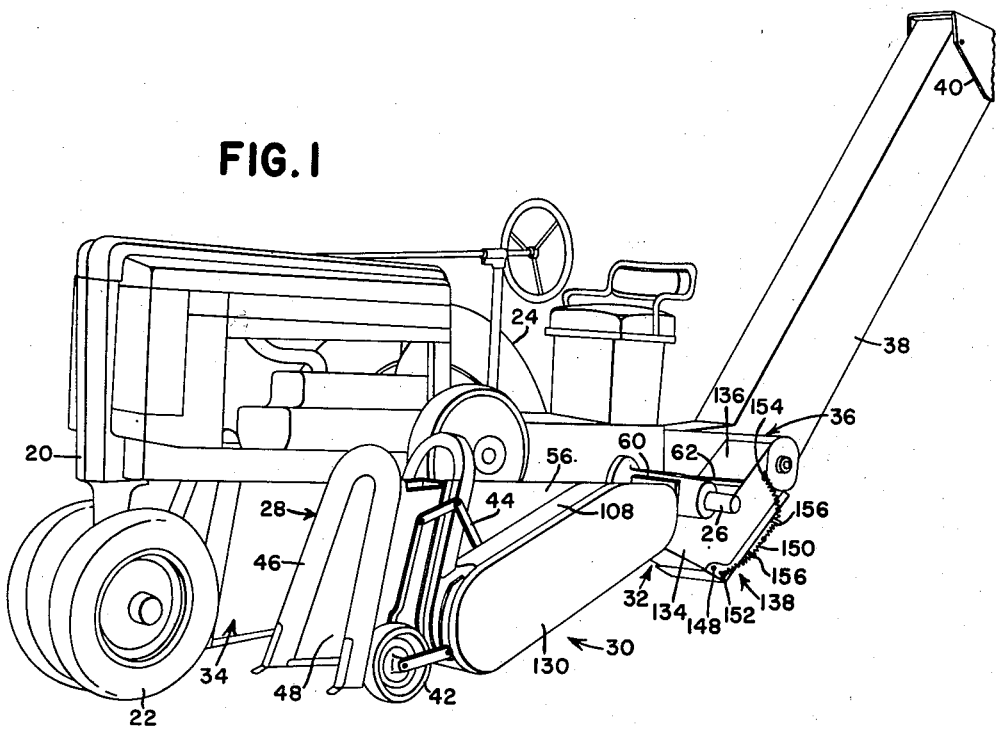
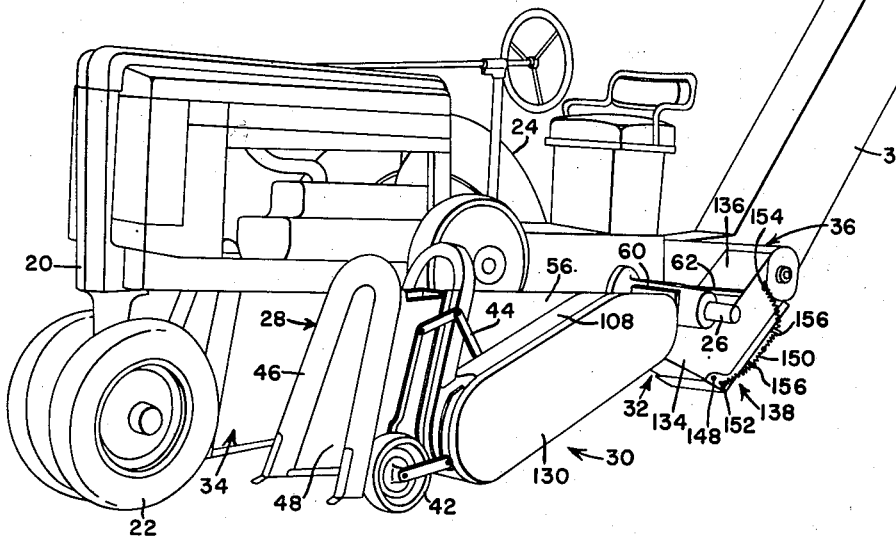
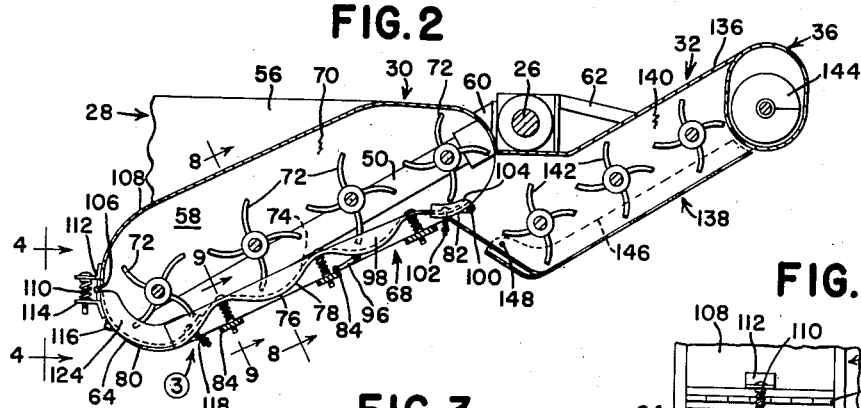
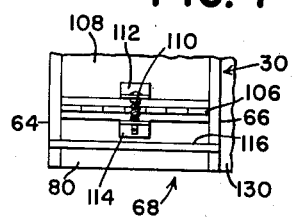
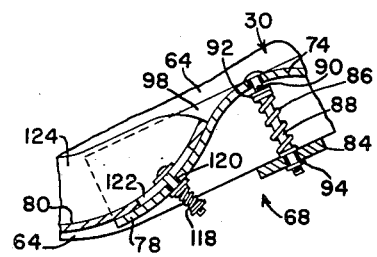
INVENTOR.
D. L. HENSLEY April 22, 1958     D. L. HENSLEY     2,831,565
FLEXIBLE SCREEN BOTTOM FOR COTTON STRIPPERS
Filed April 27, 1955     2 Sheets-Sheet 2
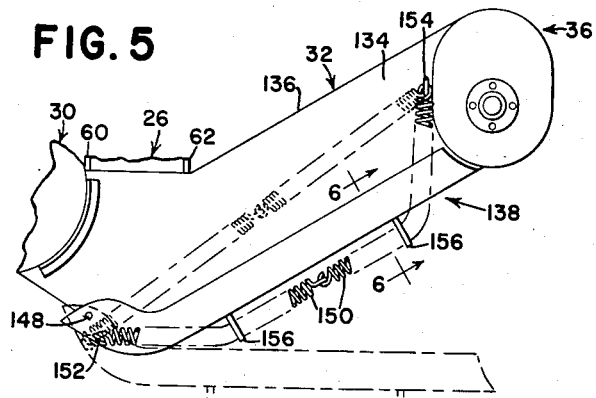
FIG. 5
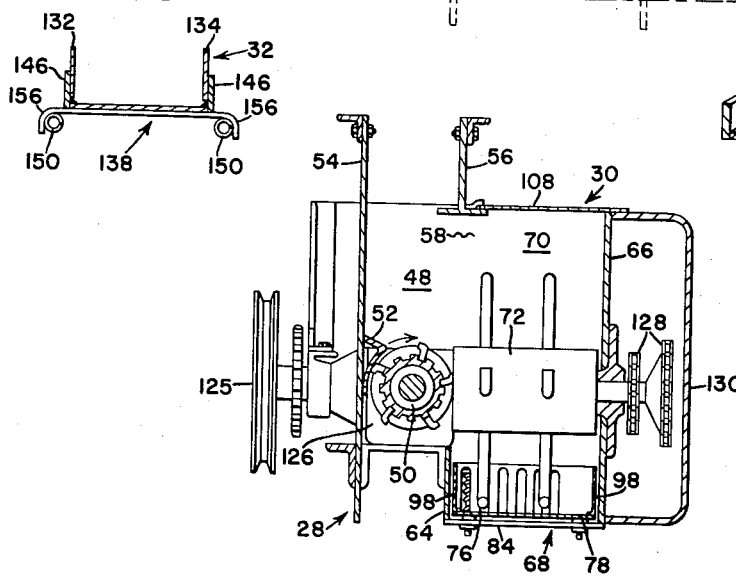
FIG. 6
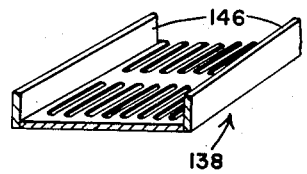
FIG. 7
FIG. 8
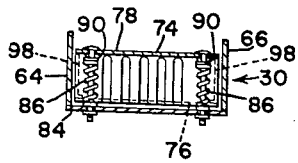
FIG. 9
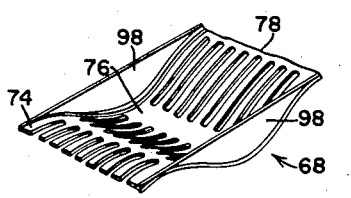
FIG. 10
INVENTOR.
D. L. HENSLEY

# United States Patent Office 2,831,565
Patented Apr. 22, 1958

2,831,565

FLEXIBLE SCREEN BOTTOM FOR COTTON STRIPPERS

Douglas L. Hensley, Paint Rock, Tex., assignor to Deere Manufacturing Co., Dubuque, Iowa, a corporation of Iowa Application April 27, 1955, Serial No. 504,237

9 Claims. (Cl. 198—82)

This invention relates to conveyor means and more particularly to such means as especially adapted for use with a cotton harvester of the stripper type.

A typical harvester of the general character referred to above is shown in the U. S. patent to Roscoe 2,533,510, from which it will appear that a conventional agricultural tractor comprises a mobile support at each side of which is carried a cotton-stripping mechanism for stripping cotton bolls from plants as the machine advances. Stripping is effected between a rotatable roll and a fixed stripper bar, and the stripped bolls are transferred laterally to a first conveyor unit having a screen or perforate bottom over which the bolls are advanced by conveyor elements such as rotatable finger wheels. From the front conveyor unit, the cotton is advanced to a rear conveyor unit constructed similar to the front conveyor unit and thence to transverse conveyor means for delivery into the hopper of a wagon elevator. The rear end of the wagon elevator discharges into a wagon or other trailer towed by the machine.

Because of the very nature of the stripping action, as distinguished from the harvesting method that comprises picking only the ripe cotton, considerable incidental trash in the form of leaves, branches, etc. will be gathered by the machine. The purpose of the screened bottoms in the conveyor units is to sift out as much as possible of this incidental trash. Moreover, the type of cotton that can be stripped rather than picked has been developed as a special variety over the years, and one characteristic of this cotton is that it grows relatively close to the ground. In sandy soils, some of the bolls will actually be beneath the ground surface. Consequently, considerable dirt and sand will be taken into the machine. Because of the expansion of the cotton grower into terrain heretofore uncultivated because of its rocky nature, new problems have arisen, foremost among which is the problem of taking in rocks along with dirt and other incidental trash. Consequently, the material handled by the machine is of such nature as to impose on the machine performance requirements not heretofore expected. The rocks are normally so large and of course are not yieldable as to be incapable of being sifted out through the perforated bottom. An accumulation of rocks and incidental trash will therefore clog the conveyor units, very often resulting in breakage of the conveyor elements or damage to other parts of the machine. According to the present invention, the machine is improved by the provision of yieldable or flexible bottom structures in each of the conveyor units, each structure being capable of downward displacement in response to excess pressures caused by material that cannot be readily passed by the conveyor elements. The invention features the provision of different types of bottom structures for the front and rear conveyor units. One bottom structure is in the form of a plurality of articulately interconnected sections having what may be termed a floating mounting relative to the conveyor element so that portions thereof may yield while other portions remain substantially in their normal positions. Consequently, as one portion of the bottom section is deflected, it will not disturb the conveying action at other portions. The invention provides an improved and economical construction that may be readily added to machines already in existence.

The foregoing and other important objects and desirable features inherent in and encompassed by the invention will become apparent as preferred embodiments of the invention are disclosed in detail in the ensuing specification and accompanying sheets of drawings, the several figures of which will be described immediately below.

Fig. 1 is a perspective view of a tractor-mounted harvester, one of the rear tractor wheels being omitted to expose significant structure.

Fig. 2 is a fragmentary sectional view on an enlarged scale, showing the front and rear conveyor units.

Fig. 3 is an enlarged sectional view of the forward portion of the front conveyor unit as designated generally by the arrow bearing the encircled numeral 3 in Fig. 2.

Fig. 4 is an enlarged front elevational view as seen along the line 4—4 of Fig. 2.

Fig. 5 is an enlarged elevational view of the rear conveyor unit illustrating in dotted lines the downward position of the bottom structure.

Fig. 6 is a transverse sectional view as seen along the line 6—6 of Fig. 5.

Fig. 7 is a fragmentary perspective view of the rear bottom structure.

Fig. 8 is an enlarged transverse sectional view on the line 8—8 of Fig. 2.

Fig. 9 is a transverse sectional view on the line 9—9 of Fig. 2.

Fig. 10 is a fragmentary perspective view of a portion of the bottom structure for the front conveyor units.

Those familiar with cotton strippers of the type shown in the above-identified Roscoe patent will recognize in Fig. 1 a typical agricultural tractor having a main body 20 supported on front and rear wheel 22 and 24, the left hand rear wheel being removed to expose the left hand rear axle 26 and to illustrate more clearly the mounting at the left hand side of the tractor of cotton stripper means comprising stripper mechanism 28, a front side conveyor unit 30 and a rear side conveyor unit 32. That similar structure is arranged at the opposite side of the tractor will be evident from the presence of right hand structure partly visible at 34. Only the left hand structure will be described.

As the machine advances, cotton is stripped from plants growing in rows and the stripped cotton is transferred laterally from the mechanism 28 to the front side conveyor unit 30, whence it is delivered rearwardly to the rear conveyor unit 32. This unit delivers the cotton into a transverse conveyor housing 36 and from there the cotton enters an upwardly and rearwardly inclined wagon elevator 38 to exit at the upper rear end 40 of that elevator for delivery into a wagon or trailer (not shown) towed by the machine. A gauge wheel 42 serves as an auxiliary support for the harvesting mechanism and is appropriately adjustable through linkage 44, the details of which are not important here and are referred to briefly only because they form part of the illustrated structure.

The nature of the stripping mechanism may be best understood from Figs. 1 and 8. As shown in Fig. 1, the front part of the stripper mechanism 28 includes an inverted U-shaped housing 46 between the sides of which is defined a gathering throat 48. This throat extends fore and aft and as the machine advances growing plants are received in the throat and are caused to be passed through or received between a rotatable stripper roll 50 and a companion stripped bar 52. The roll 50 rotates in the direction of the arrow (Fig. 8) and causes the cotton to be transferred laterally into the front conveyor unit 30. An inner side wall 54 defines the inner marginal portion of the throat 48, and a laterally offset but vertically shorter side wall 56 provides an opening at 58 whereby the cotton may move from the stripping mechanism laterally into the conveyor unit 30.

Because of the downward and forward inclination of the stripper roll 50 (Fig. 2), the front end operates fairly close to the ground and, as already pointed out, in some cases, especially where the soil is ridged, the front end of the roll will actually enter the ground to some extent. Consequently, incidental trash, including leaves, stems, branches, dirt, sand and rocks and the like, will be taken into the machine along with the cotton bolls. Larger portions of this incidental trash that do not sift out during the srtipping action are transferred through the opening 58 to the front conveyor unit 30. This unit is, in the construction illustrated, disposed alongside the stripping mechanism 28 and is suitably mounted on the rear axle 26 by bracket means 60. The rear unit 32 is mounted on the rear axle by bracket means 62. The structure illustrated is only representative.

Because of its association with the stripper mechanism 28, the front conveyor unit shares with that mechanism an inner upright side wall 64, disposed in the plane of the stripper mechanism side wall 56 and being of relatively low vertical height to contribute to the formation of the cotton transfer opening 58. In addition to the wall 64, the front conveyor unit 30 includes an outer upright side wall 66. The walls 64 and 66, together with bottom structure 68, define a fore-and-aft material passage 70, within which are rotatably mounted a plurality of fore-and-aft spaced apart conveyor elements or finger wheels 72 which collectively constitute conveyor means for moving material, including cotton and incidental trash, rearwardly over the bottom structure 68 to the rear or discharge end of the unit 30 for transfer to the front or boot end of the unit 32. The forward end of the unit 30 is commonly known as its boot end, as is typical of nomenclature used in the material-conveying art.

The finger wheels 72 rotate in counterclockwise directions as seen in Fig. 2, thereby impelling the material over the bottom structure 68. The clearance between the fingers of the wheels and the bottom structure 68 is necessarily limited and the pressures on the bottom structure as exerted by the finger wheels and material passing between the wheels and the bottom structure will vary according to the nature and quantity of the material. The bottom structure 68 is perforated or formed as a screen, as best shown in Fig. 10, and is also of a sinuous character to afford alternate peaks and valleys 74 and 76, respectively. The valleys are respectively in register with the wheels 72 and the peaks 74 occur respectively between the wheels. Because of the perforate nature of the bottom, considerable finer trash will be sifted therethrough as the material is advanced toward the rear or discharge end of the unit 30.

It will therefore be readily seen that should the machine take in trash of a relatively large or unyielding nature, pressures exerted on the bottom structure 68 will become excessive and unless some means is provided for relieving the situation, damage will likely result. Rocks and stones are found to be the principal offenders in this respect. For that reason, the bottom structure is mounted for downward displacement from its normal operating position, as shown in Fig. 2. The means for mounting the bottom structure has many desirable characteristics, all of which are illustrated here. For example, the bottom structure 68 is shown as being made up of a plurality of articulately interconnected but otherwise separate sections, including an intermediate section 78, a boot section 80, and a discharge section 82. The boot section 80 is adjacent to the forward or boot wheel 72; the discharge section 82 is similarly arranged relative to the discharge element or wheel 72, and the intermediate section 78 cooperates with the two intermediate wheels 72.

The intermediate section 78 is mounted by that portion of the mounting means that comprises a plurality of crossbars or supports 84, each of which is rigidly secured at its opposite ends to the side walls 64 and 66 (Fig. 9). Each crossbar 84 carries a pair of biasing means, each in the form of a coiled spring 86 mounted on an upright pin 88, the headed end of which is received at the proximate peak 74 of the section 78. A cross pin or cotter key 90 prevents upward displacement of the mounting pin 88 relative to the section 78. The spring acts between the crossbar 84 and a washer 92 stopped by the cotter pin 90. And a washer and cotter pin assembly 94 prevents upward escape of the mounting pin 88 from the crossbar 84. As seen in Fig. 2, there are three biasing means of the character just described, and all are substantially identical. The arrangement is such that there is sufficient lost motion in the connections to permit the bottom section 78 to yield downwardly in a bodily manner or in a tilting manner, depending upon the character of the offending trash and depending also upon which finger wheel and valley is involved. The pressures or forces exerted by the finger wheels 72 and the material as the material is moved over the bottom will include rearward as well as downward pressures. In order that rearward displacement of the section 78 will be prevented, stabilizer means in the form of one or more links 96 is connected between the central crossbar 84 and the proximate portion of the section 78. The stabilizer linkage and its connections as described do not interfere with the free vertical movement of the section 78. The lower cotter pin and washer assemblies 94 establish stops for determining the limit on upward movement of the section 78 to the normal operating position as illustrated in the drawings.

The bottom structure 68 has at opposite sides thereof upright side shields 98 (Fig. 10), which preferably extend lengthwise of the section 78 from peak to peak to provide means for preventing lateral escape of material as the section 78 is deflected or displaced downwardly. The side shields 98 operate as closures in cooperation with the side walls 64 and 66.

The discharge section 82 of the bottom structure is pivotally mounted by a hinge pin 100 that is appropriately mounted at its opposite ends to rear portions of the side walls 64 and 66. The section 82 is further articulately connected to the proximate portion of the intermediate section 78 as by spring and pin means 102. Side walls or shields 104 give the section 82 a trough characteristic and the side walls, like the side walls or shields 98 on the section 78, prevent loss of material in a lateral direction as the section 82 is downwardly displaced.

The boot section 80 is hinged to the unit 30 by a transverse hinge member or pivot pin 106, which is carried by the lower terminal edge of a top wall 108 that extends fore and aft for enclosing the passage 70 from the top. The boot section 80 is biased to its normal position by means of a spring and pin assembly 110 acting between a bracket 112 fixed to the top wall 108 and a bracket 114 fixed to the boot section. Inward movement of the section 80 toward the boot wheel 72 is limited by a stop 116 in the form of a rod rigid on the boot section and having opposite ends respectively engageable with forward portions of the side walls 64 and 66 (Fig. 4). Articulate interconnection of the sections 78 and 80 is effected by spring and pin means 118, shown generally in Fig. 2 and shown in detail in Fig. 3. As shown in the latter figure, the spring and pin means 118 is carried in an aperture 120 in the front portion of the section 78 and the lapping rear portion of the section 80 is slotted at 122 to establish articulation and to permit the boot section to swing downwardly and forwardly relative to the intermediate section 78. The structure just described may be taken as representative of that at 102 between the rear end of the section 78 and the front end of the discharge section 82. The boot section 80 has side wall or shield portions 124 which cooperate with the side walls 64 and 66 to prevent lateral escape of cotton as the boot section is displaced.

The driving mechanism for the roll 50 and finger wheel 72 may be of the type shown in the above-identified Roscoe patent. In any event, the details thereof are not material here. Representative portions of that driving mechanism are illustrated in Fig. 8 as including an input sheave 124 which enters a housing 126 to drive, through appropriate gearing (not shown), the stripper roll 50 as well as the finger wheels 72. Drive chain interconnections of the several finger wheels 72 are suggested at 128, and this mechanism is enclosed from its outer side by a shield 130.

As will be apparent from Fig. 2, the unit 30 discharges into the boot or forward end of the unit 32. The unit 32 includes laterally spaced apart upright side walls 132 and 134 (Fig. 6), a top wall 136, and a bottom structure 138, all of which defines a material passage 140 for recetiving material from the unit 30. A plurality of finger wheels 142 constitute rotatable conveyor elements rotatable respectively in counterclockwise directions as seen in Fig. 2 for moving material rearwardly over the bottom structure 138, whence the material exits to the cross housing 36 in which is mounted suitable conveyor means such as an auger 144. The material-handling characteristics of the unit 32 are similar to those of the unit 30. That is to say, the finger wheels 140 will exert downward and rearward pressures on the bottom structure 138 and the bottom structure will or will not yield, depending upon the quantity and nature of the material being handled.

The bottom structure 138 is preferably in the form of a trough and the bottom portion thereof is perforate (Fig. 7). The trough nature of the bottom establishes upright side walls or shields 146 and these prevent lateral escape of material as the bottom is displaced about a transverse front hinge or pivot pin 148. As will be seen, the bottom 138 is of one-piece construction as distinguished from the articulately interconnected sections of the bottom 68 but in other respects the functional relationship to the finger wheels 142 is the same. In order that the bottom 138 may be yieldably retained in its operating position as shown in full lines in Fig. 5, means in the form of tension spring means has been provided. Each tension spring means comprises a pair of end-to-end interconnected tension springs 150, there being one spring means or assembly at each side of the unit 32. The front end of one spring 150 is connected at 152 to the bottom 138 at a point spaced from the hinge 148 so as to establish a moment arm via which the spring means acts on the bottom. The rear end of one spring 150 is connected to the front end of the other spring 150 and the rear end of the second spring is connected at 154 to an anchor point on the side wall of the unit 32. When the bottom 138 is in its normal position (full lines in Fig. 5), the springs 150 are stretched and hook under releasable means in the form of laterally and downwardly directed hooks 156. The springs therefore hold the bottom 138 yieldably in place so that the bottom may be displaced from its normal position in the event of excess pressures occurring because of the presence of rocks or other non-yielding material passing through the passage 140 under the conveyor wheels 142.

In the event that it is desired to drop the bottom 138 for inspection or to remove offending trash, the springs 150 may be unhooked from the hooks 156, producing the result illustrated in dotted lines in Fig. 5. The springs 150 then act as counterbalancing springs on the bottom 138, because of the moment arm established between the pivot 148 and the spring connection at 152.

The bottom 138 is preferably flat from end to end as distinguished from the sinuous character of the bottom 68. However, these differences are immaterial in the broad sense, since in both cases there is a bottom structure mounted below the conveyor means 72 or 142 for downward displacement from a normal operating position.

Other characteristics of the structures, as well as specific features not categorically enumerated herein, will occur to those versed in the art, as will many modifications and alterations in the preferred embodiments of the invention illustrated, all of which may be achieved without departing from the spirit and scope of the invention.

What is claimed is:

1. A conveyor unit for handling material including stripped cotton and incidental trash received from the stripper mechanism of a mobile cotton stripper, comprising: a pair of upright spaced apart side walls and a bottom arranged along the lower edge portions of said side walls to define a material passageway; undershot conveyor means movably carried by the unit between the side walls and above the bottom for moving material over said bottom; said bottom including a plurality of interconnected sections respectively having normal positions proximate to the conveyor means so as to be individually subject to varying pressures as material moves between the conveyor means and said sections; and yieldable means mounting said sections for individual downward displacement in response to excess pressures created by the conveyor means and the material.

2. A conveyor unit for handling material including stripped cotton and incidental trash received from the stripper mechanism of a mobile cotton stripper, comprising: a housing having a boot end and a discharge end and including upright side walls spaced apart to define a material passageway; a bottom structure lying along the lower edge portions of the side walls to support material received in the passageway; a plurality of conveyor elements spaced apart along the passageway and above the bottom structure for moving material over said structure, said elements including a boot element, a discharge element and an intermediate element; said bottom including individual boot, discharge and intermediate sections respectively adjacent to the boot, discharge and intermediate elements and normally positioned respectively proximate to said elements so as to be subject to downward pressures as the elements move material thereover to the discharge end; and a plurality of means respectively mounting the sections for downward displacement relative to the respective elements as said pressures increase.

3. The invention defined in claim 1, in which: each section has opposite side shields cooperative with the lower edge portions of the side walls to restrain material against lateral escape during downward displacement of said section.

4. The invention defined in claim 1, in which: each section is articulately and yieldably connected to its neighboring section.

5. The invention defined in claim 1, in which: each conveyor element is rotatable; and the bottom structure is sinuous, having valleys respectively below the elements and peaks respectively between the elements, and said sections are shaped in accordance with the sinuous character of the bottom structure.

6. The invention defined in claim 5, in which: the means for mounting at least the intermediate section of the bottom structure includes a cross support connected to the side walls and positioned below a peak in said structure, and spring means extending between and engaging said peak and said cross support.

7. The invention defined in claim 6, in which: stabilizing means is connected between the cross support and the bottom structure for stabilizing the bottom structure against rearward displacement.

8. A conveyor unit for handling material including stripped cotton and incidental trash received from the stripper mechanism for a mobile cotton stripper, comprising: a pair of upright spaced apart side walls and a bottom arranged along the lower edge portion of the side walls to define a material passageway; undershot conveyor means movably carried by the unit between the side walls and above the bottom for moving material over the bottom and through the passageway; the bottom having a normal position proximate to the conveyor means so as to be subject to downward pressure as material moves between the conveyor means and the bottom; transverse pivot means hinging the bottom at one end of the unit; a pair of tension spring means, one at each side of the unit, each spring means having a first end connected to the bottom adjacent to but spaced from the pivot means so as to afford a movement arm acting upwardly on the bottom, and each spring means having a second end connected to the unit remote from the first end; and means on the bottom engaging each spring means intermediate the ends, the means on the bottom being releasable from the spring means to enable downward swinging of the bottom opposed only by the action of the spring means on the bottom via the aforesaid moment arm.

9. The invention defined in claim 8 in which: the means on the bottom engaging the spring means are laterally outwardly and downwardly directed hooks that releasably hook over the respective spring means.

References Cited in the file of this patent

UNITED STATES PATENTS

| | | |
|---|---|---|
| 2,045,081 | Hart | June 23, 1936 |
| 2,194,475 | Kurtz | Mar. 26, 1940 |
| 2,533,510 | Roscoe | Dec. 12, 1950 |

U. S. DEPARTMENT OF COMMERCE
PATENT OFFICE

CERTIFICATE OF CORRECTION

Patent No. 2,831,565     Douglas L. Hensley     April 22, 1958

It is hereby certified that error appears in the printed specification of the above numbered patent requiring correction and that the said Letters Patent should read as corrected below.

Column 7, line 19, for "movement" read --moment--.

Signed and sealed this 1st day of July 1958.

(SEAL)
Attest:
KARL H. AXLINE
Attesting Officer

ROBERT C. WATSON
Commissioner of Patents